United States Patent
Fleischheuer et al.

(10) Patent No.: US 10,072,690 B2
(45) Date of Patent: Sep. 11, 2018

(54) HYBRID COMPONENT AND METHOD FOR PRODUCING A HYBRID COMPONENT

(75) Inventors: Simon Fleischheuer, Muehlheim an der Ruhr (DE); Robin Ndagijimana, Neuss (DE); Harald Mund, Solingen (DE); Nils Frisse, Köln (DE); Anup Saravade, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 1042 days.

(21) Appl. No.: 14/342,773

(22) PCT Filed: Jun. 14, 2012

(86) PCT No.: PCT/EP2012/061283
§ 371 (c)(1),
(2), (4) Date: Jun. 12, 2014

(87) PCT Pub. No.: WO2013/034323
PCT Pub. Date: Mar. 14, 2013

(65) Prior Publication Data
US 2014/0328614 A1    Nov. 6, 2014

(30) Foreign Application Priority Data

Sep. 5, 2011 (DE) .......................... 10 2011 112 298

(51) Int. Cl.
*F16B 11/00*    (2006.01)
*B60N 2/68*     (2006.01)
(Continued)

(52) U.S. Cl.
CPC ............ *F16B 11/006* (2013.01); *B60N 2/682* (2013.01); *B60N 2/686* (2013.01); *B62D 27/026* (2013.01);
(Continued)

(58) Field of Classification Search
CPC .. B62D 29/005; B62D 27/026; B62D 29/001; Y10T 403/472; Y10T 403/74; F16B 11/006; B60N 2/682; B60N 2/686
See application file for complete search history.

(56) References Cited

U.S. PATENT DOCUMENTS

| 4,601,511 A | 7/1986 | Nakamura et al. |
| 4,791,765 A * | 12/1988 | Noggle ..................... B32B 3/00 219/86.1 |

(Continued)

FOREIGN PATENT DOCUMENTS

| CN | 101695749 A | 4/2010 | |
| DE | 3151266 A1 * | 7/1983 | ............. B62D 21/09 |

(Continued)

OTHER PUBLICATIONS

Office Action dated Jul. 3, 2015, in corresponding Chinese Application No. 201280043082.7, 11 pages.
(Continued)

*Primary Examiner* — Michael P Ferguson
*Assistant Examiner* — Matthew R McMahon
(74) *Attorney, Agent, or Firm* — Foley & Lardner LLP

(57) ABSTRACT

A hybrid component is formed by a profiled component of a first material, which is materially bonded in certain sections to a component made of a second material, and is connected by a form-fit and/or force-fit connection outside the sections with a material bond. This creates sections that relieve the strains resulting from differing thermal expansion.

3 Claims, 7 Drawing Sheets

(51) Int. Cl.
B62D 27/02 (2006.01)
B62D 29/00 (2006.01)

(52) U.S. Cl.
CPC ........... B62D 29/00 (2013.01); B62D 29/005 (2013.01); *Y10T 29/49826* (2015.01); *Y10T 403/472* (2015.01); *Y10T 403/74* (2015.01)

(56) References Cited

U.S. PATENT DOCUMENTS

| | | | | |
|---|---|---|---|---|
| 5,314,280 | A * | 5/1994 | Gagliardi | B62D 25/163 |
| | | | | 29/525.02 |
| 5,362,120 | A * | 11/1994 | Cornille, Jr. | B62D 27/026 |
| | | | | 156/295 |
| 6,027,160 | A * | 2/2000 | Brodt | B62D 25/06 |
| | | | | 296/210 |
| 6,421,979 | B1 | 7/2002 | Fischer et al. | |
| 6,931,730 | B2 * | 8/2005 | Elliott | B62D 23/00 |
| | | | | 156/91 |
| 7,819,452 | B2 * | 10/2010 | Fuchs | B23K 11/11 |
| | | | | 156/60 |
| 8,708,390 | B2 * | 4/2014 | Kurogi | B62D 25/02 |
| | | | | 296/203.03 |
| 9,242,715 | B2 * | 1/2016 | Cosentino | B64C 1/12 |
| 2003/0134090 | A1 * | 7/2003 | Tate | B62D 29/001 |
| | | | | 428/174 |
| 2007/0134452 | A1 | 6/2007 | Merkle et al. | |
| 2007/0145188 | A1 * | 6/2007 | Specht | B29C 65/00 |
| | | | | 244/125 |
| 2009/0236039 | A1 * | 9/2009 | Tanaka | C09J 5/06 |
| | | | | 156/292 |
| 2011/0229250 | A1 * | 9/2011 | Kleber | B60J 5/0437 |
| | | | | 403/29 |

FOREIGN PATENT DOCUMENTS

| | | | | |
|---|---|---|---|---|
| DE | 19737966 | A1 * | 8/1998 | ........... B29C 65/562 |
| DE | 10 2008 013 506 | A1 | 9/2008 | |
| DE | 102012220333 | A1 * | 5/2013 | ........... B62D 27/026 |
| EP | 1 048 816 | A2 | 3/2001 | |
| EP | 2 508 413 | A1 | 10/2012 | |
| JP | 59-011975 | A | 1/1984 | |
| JP | 62-171313 | | 7/1987 | |
| JP | 09-039846 | A | 2/1997 | |
| JP | 10-316022 | A | 12/1998 | |
| JP | 2000-309283 | A | 11/2000 | |
| JP | 2004-130986 | A | 4/2004 | |
| JP | 2004-228278 | A | 8/2004 | |
| JP | 2006-213129 | A | 8/2006 | |
| JP | 2009-220604 | A | 10/2009 | |
| WO | WO 01/58740 | A1 | 8/2001 | |
| WO | WO 2005/035339 | A1 | 4/2005 | |

OTHER PUBLICATIONS

English machine translation of Office Action dated Apr. 22, 2015, received in corresponding Japanese application No. 2014-527534, 6 pages.
Office Action dated Nov. 10, 2015, received in corresponding Japanese application No. 2014527534 with its English machine translation, 7 pages.
Decision to Grant dated Feb. 23, 2016, received in corresponding Japanese application No. 201452734 with its English machine translation, 6 pages.
International Search Report issued in related International Patent Application No. PCT/EP2012/061283, completed Dec. 20, 2012.
Office Action dated Jun. 29, 2016, received in corresponding Korean Application No. 10-2016-7008901 and English translation, 7 pages.
Office Action dated Apr. 22, 2015, received in corresponding Japanese application No. 2014-527534, 7 pages.

* cited by examiner

HYBRID COMPONENT AND METHOD FOR PRODUCING A HYBRID COMPONENT

The present application is a U.S. National Phase of International Patent Application No. PCT/EP2012/061283, filed Jun. 14, 2012, which claims priority from German Patent Application No. 10 2011 112 298.6, filed Sep. 5, 2011. The contents of these applications are incorporated herein by reference in their entirety.

The invention relates to a hybrid component and a method for producing a hybrid component.

Structural elements, in particular of vehicle rear seats, are formed in the prior art as hybrid components made of steel and/or sheet metal components welded together.

It is the object of the present invention to specify a hybrid component which is improved relative to the prior art and to specify an improved method for producing a hybrid component from at least two thin-walled components consisting of different materials.

With regard to the hybrid component, the object is achieved by the features set forth in claim 1.

With regard to the method, the object is achieved by the features set forth in claim 13.

Advantageous developments of the invention form the subject-matter of the subclaims.

The hybrid component according to the invention is characterized by a profiled component made of a first material which is partially connected by a material connection to a component made of a second material and is connected by means of a positive and/or non-positive connection outside the portions with the material connection.

For example, a profiled component made of a first material is adhesively bonded onto a component configured as a metal sheet made of a second material by means of an adhesively bonded connection and/or riveted by means of a riveted connection. Thus so-called hybrid components made of different materials may be produced in a simple manner, wherein a particularly high degree of rigidity of the hybrid component according to the invention is able to be achieved in mass production.

In a first variant, the profiled component, which has a U-shaped cross section and in each case has a substantially planar flange region on both sides, is placed with its flange regions on the substantially planar component, such that an internal space is formed between the profiled component and the planar component, wherein between the component and the flange regions an adhesive material, in particular an adhesive, is partially arranged and riveted connections are formed as a non-positive and/or positive connection outside the portions of the flange regions provided with adhesive material. In this manner, an extensive material connection between the profiled component and the substantially planar component, which is usually in the prior art, is avoided. Particularly advantageously, the surface irregularities resulting from such an extensive material connection and the different thermal extensions of the materials of the profiled component and the planar component, such as for example bulges or corrugations, are reliably avoided in the hybrid component. Advantageously, the adhesively bonded connection is additionally secured by means of a plurality of unreleasable riveted connections.

Advantageously, in a region of the component adjoining the internal space, round holes or elongated holes uniformly spaced apart from one another are formed in the component along a longitudinal extent of the hybrid component. By means of the round holes or elongated holes incorporated in the component in a defined manner, the different thermal stresses between the profiled component and the component are relieved and thus surface irregularities in the hybrid component are prevented. Furthermore, by means of the round holes or elongated holes, the weight of the component and, as a result, that of the entire hybrid component is reduced.

In this case, the elongated holes may be preferably aligned in their longitudinal extent according to the longitudinal extent of the hybrid component or the elongated holes are aligned in the component in their longitudinal extent transversely to the longitudinal extent of the hybrid component.

The round holes or the elongated holes are expediently arranged adjacent to one another in the direction of the longitudinal extent of the hybrid component.

In an alternative variant, the portions of the flange regions provided, in particular coated, with adhesive are interrupted by regions in which elongated holes are arranged, wherein the elongated holes are formed in the component and/or in the flange region of the profiled component, and wherein the elongated holes are aligned in their longitudinal extent according to the longitudinal extent of the flange region. Thus riveted connections, portions provided with adhesive and elongated holes are arranged alternately in the flange regions, whereby the long adhesively bonded connections which are common in the prior art are avoided.

In a further variant, at least one embossed portion is arranged in the component, said embossed portion being formed along a longitudinal extent of the hybrid component in the region of the component which adjoins the internal space. By means of the embossed portion, in particular the flexural rigidity of the hybrid component is significantly increased.

In a further preferred variant, a plurality of embossed portions are arranged in the component, said embossed portions extending transversely to the longitudinal extent of the hybrid component over the entire component, wherein in the region of the embossed portions no adhesive is arranged in the flange regions. Thus riveted connections, portions provided with adhesive and embossed portions are arranged alternately in the flange regions.

In a further expedient variant, a plurality of x-shaped embossed portions are arranged in the component, extending over the entire component, wherein in the region of the embossed portions no adhesive is arranged in the flange regions. As a result, riveted connections, portions provided with adhesive and embossed portions are arranged alternately in the flange regions, whereby the long adhesively bonded connections common in the prior art are avoided and by means of the x-shaped embossed portions, in particular, a flexural rigidity of the hybrid component is significantly increased.

In a further variant, in a region of the component adjoining the internal space, circular embossed portions uniformly spaced apart from one another are formed in the component along a longitudinal extent of the hybrid component. By means of the circular embossed portions incorporated in a defined manner in the component, the different thermal stresses between the profiled component and the substantially planar or flat component are relieved and thus surface irregularities in the hybrid component are prevented.

Particularly preferably, the embossed portions are arranged adjacent to one another in the direction of the longitudinal extent of the hybrid component.

In a further preferred variant, the portions of the flange regions coated with adhesive are interrupted by regions in which circular embossed portions are arranged in the flange region, wherein the circular embossed portions in each case are formed in the component and in the flange region of the profiled component, and wherein the circular embossed portions of the component and the flange region are arranged in a congruent manner. The circular embossed portions in the component and flange region permit a simple alignment of the components during the production of the hybrid component and interrupt the portions of the flange regions provided with adhesive.

In the method for producing a hybrid component, according to the invention a profiled component made of a first material is partially connected by a material connection to a component made of a second material and is connected positively and/or non-positively outside the portions with the material connection.

Hybrid components produced by means of the method are advantageously reduced in weight and are particularly flexurally rigid.

Particularly advantageously, by means of the present method surface irregularities such as for example bulges or corrugations in the hybrid component are reliably avoided.

As a result, the visual appearance of the surface of the hybrid component is improved.

Moreover, a load-bearing capacity of the material connection, in particular an adhesively bonded connection, of the hybrid component and thus of the entire hybrid component is itself increased.

Surface irregularities which traditionally occur in hybrid components result from the different thermal extensions of the materials of the hybrid component. Said stresses within the hybrid component are avoided or are relieved when the component is produced according to the method according to the invention and undesired surface irregularities no longer occur.

The invention is described in more detail with reference to the accompanying schematic figures.

In the drawings:

FIG. 1 shows schematically a partially transparent plan view of a hybrid component produced by means of the method according to the invention in a first embodiment, FIG. 2 shows schematically a partially transparent plan view of a hybrid component produced by means of the method according to the invention in a second embodiment, FIG. 3 shows schematically a partially transparent plan view of a hybrid component produced by means of the method according to the invention in a third embodiment, FIG. 4 shows schematically a partially transparent plan view of a hybrid component produced by means of the method according to the invention in a fourth embodiment, FIG. 5 shows schematically a partially transparent plan view of a hybrid component produced by means of the method according to the invention in a fifth embodiment, FIG. 6 shows schematically a partially transparent plan view of a hybrid component produced by means of the method according to the invention in a sixth embodiment, FIG. 7 shows schematically a plurality of cross sections of different embossed portions, FIG. 8 shows schematically a partially transparent plan view of a hybrid component produced by means of the method according to the invention in a seventh embodiment, FIG. 9 shows schematically a plurality of alternative cross sections of different embossed portions, FIG. 10 shows schematically a perspective view of the seventh embodiment of the hybrid component, FIG. 11 shows schematically a partially transparent plan view of a hybrid component produced by means of the method according to the invention in an eighth embodiment, FIG. 12 shows schematically a detailed view of a sheet metal portion of the eighth embodiment of the hybrid component in a perspective view, FIG. 13 shows schematically a partially transparent plan view of a hybrid component produced by means of the method according to the invention in a ninth embodiment, FIG. 14 shows schematically a detailed view of the ninth embodiment of the hybrid component in a perspective view, FIG. 15 shows schematically a partially transparent plan view of a hybrid component produced by means of the method according to the invention in a tenth embodiment and FIG. 16 shows schematically a detailed view of the tenth embodiment of the hybrid component in a perspective and partially transparent view.

Parts which correspond to one another are provided in all the figures with the same reference numerals.

A partially transparent plan view of a hybrid component produced by means of the method according to the invention in a first embodiment is shown schematically in FIG. 1.

The hybrid component 1 is preferably formed from a U-shaped profiled component 2 and a component 3.

The profiled component 2 and the component 3 are formed from different materials, for example aluminum, steel or plastics.

In each case a substantially planar flange region 4 is formed on both sides of the U-shaped profiled component 2.

The component 3 is formed as a conventional flat or planar metal sheet, onto which the U-shaped profiled component 2 is placed with its flange regions 4 such that an internal space 5 is formed between the profiled component 2 and the component 3. For greater clarity, the flat component 3 is denoted hereinafter as the sheet metal portion 3.

The profiled component 2 and the sheet metal portion 3 are partially connected by a material connection and connected together positively and/or non-positively outside the portions with a material connection.

In one possible embodiment, an adhesive material 6, in particular an adhesive or a solder material, is partially arranged between the sheet metal portion 3 and the flange regions 4. The adhesive material 6 is called adhesive 6 hereinafter.

Additionally, the profiled component 2 and the sheet metal portion 3 are connected together outside the portions with the adhesive 6 by means of a positive and/or non-positive connection 7, in particular by means of a plurality of unreleasable riveted connections. The positive and/or non-positive connection 7 is called hereinafter the riveted connection 7.

Riveted connections 7 and portions provided, in particular coated, with adhesive 6 are arranged alternately over the extent of the flange region 4 in the manner shown in FIG. 1. In particular, in the region of the riveted connections 7 no adhesive 6 is arranged.

In this manner, an extensive material connection between the profiled component 2 and the sheet metal portion 3 which is common in the prior art is avoided. Particularly advantageously, the surface irregularities resulting from such an extensive material connection and the different thermal expansion of the materials of the profiled component 2 and the sheet metal portion 3, such as for example bulges or corrugations, are reliably avoided in the hybrid component 1.

The riveted connection 7 is configured as a conventional riveted connection, for example as a punch rivet connection.

A partially transparent plan view of the hybrid component 1 produced by means of the method according to the invention in a second embodiment is shown schematically in FIG. 2.

FIG. 2 shows a construction of the hybrid component 1 very similar to FIG. 1, but with the difference that a plurality of round holes 8 are arranged in the sheet metal portion 3.

The round holes 8 are preferably formed along a longitudinal extent of the hybrid component 1 in the region of the sheet metal portion 3 in the same region which adjoins the internal space 5. The round holes 8 are spaced uniformly apart from one another and are, for example, drilled or punched.

By means of the round holes 8 incorporated in a defined manner in the sheet metal portion 3, the different thermal stresses between the profiled component 2 and the sheet metal portion 3 are relieved and thus surface irregularities in the hybrid component 1 are prevented. Moreover, by means of the round holes 8 the weight of the sheet metal portion 3 and, as a result, the entire hybrid component 1 is reduced.

A partially transparent plan view of the hybrid component 1 produced by means of the method according to the invention in a third embodiment is shown schematically in FIG. 3.

FIG. 3 shows a construction of the hybrid component 1 very similar to FIG. 2, but with the difference that instead of the round holes 8 a plurality of elongated holes 9 are arranged in the sheet metal portion 3.

The elongated holes 9 are preferably formed along a longitudinal extent of the hybrid component 1 in the region of the sheet metal portion 3, in the same region which adjoins the internal space 5 and are uniformly spaced apart from one another. The elongated holes 9 are aligned in their longitudinal extent according to the longitudinal extent of the hybrid component 1.

A partially transparent plan view of the hybrid component 1 produced by means of the method according to the invention in a fourth embodiment is shown schematically in FIG. 4.

FIG. 4 shows a construction of the hybrid component 1, very similar to FIG. 3, but with the difference that the elongated holes 9 are aligned in their longitudinal extent in the sheet metal portion 3 transversely to the longitudinal extent of the hybrid component 1.

A partially transparent plan view of the hybrid component 1 produced by means of the method according to the invention in a fifth embodiment is shown schematically in FIG. 5.

FIG. 5 shows a construction of the hybrid component 1 very similar to FIG. 1, but with the difference that the portions of the flange regions 4 coated with adhesive 6 are interrupted by regions in which elongated holes 9 are arranged.

Thus riveted connections 7, portions coated with adhesive 6 and elongated holes 9 are arranged alternately in the flange regions 4. The elongated holes 9 are aligned in their longitudinal extent according to the longitudinal extent of the flange region 4. In the region of the elongated holes 9 no adhesive 6 is arranged between the sheet metal portion 3 and the profiled component 2. The elongated holes 9 may be formed both in the sheet metal portion 3 and in the profiled component 2.

In a particularly advantageous embodiment, the elongated holes 9 are configured in the sheet metal portion 3 according to the corresponding elongated holes 9 in the profiled component 2 and arranged in the hybrid component 1 in a congruent manner.

A partially transparent plan view of the hybrid component 1 produced by means of the method according to the invention in a sixth embodiment is shown schematically in FIG. 6.

FIG. 6 shows a construction of the hybrid component 1, very similar to FIG. 1, but with the difference that at least one embossed portion 10 is arranged in the sheet metal portion 3.

The embossed portion 10 is preferably formed along a longitudinal extent of the hybrid component 1 in the region of the sheet metal portion 3, in the same region which adjoins the internal space 5.

The embossed portion 10 extends in the direction of the longitudinal extent of the hybrid component 1 and increases the rigidity thereof. By means of the embossed portion 10, in particular, the flexural rigidity of the hybrid component 1 is significantly increased.

FIG. 7 shows schematically a plurality of cross-sectional variants of different embossed portions 10.

The embossed portions 10 are, for example, formed as a conventional bead 10.1, double bead 10.3 or recess 10.2 and are incorporated in the sheet metal portion 3 by means of a stamping method.

A partially transparent plan view of the hybrid component 1 produced by means of the method according to the invention in a seventh embodiment is shown schematically in FIG. 8.

FIG. 8 shows a construction of the hybrid component 1, very similar to FIGS. 1 and 6, but with the difference that a plurality of embossed portions 10 are arranged in the sheet metal portion 3, said embossed portions extending transversely to the longitudinal extent of the hybrid component 1.

The embossed portions 10 are arranged transversely over the entire sheet metal portion 3 so that the portions of the flange regions 4 coated with adhesive 6 are interrupted by regions in which embossed portions 10 extend. In the region of the embossed portions 10 no adhesive 6 is arranged in the flange regions 4. Thus riveted connections 7, portions coated with adhesive 6 and embossed portions 10 are arranged alternately in the flange regions 4.

Figure 11:
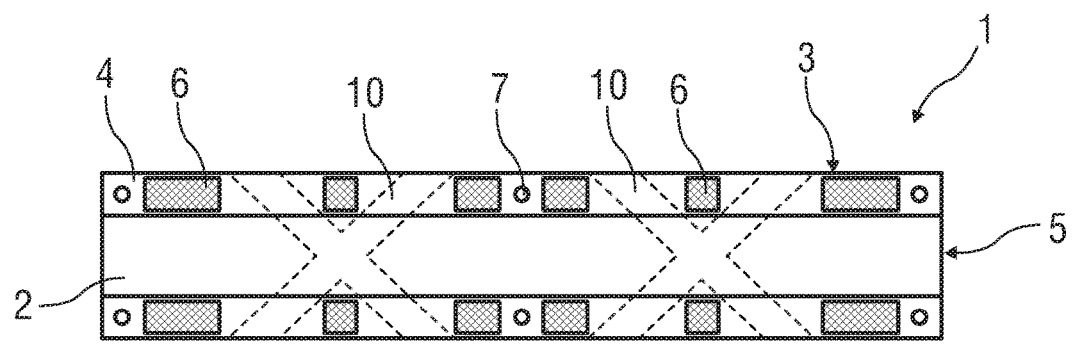

A partially transparent plan view of the hybrid component 1 produced by means of the method according to the invention in an eighth embodiment is shown schematically in FIG. 11.

Figure 6:
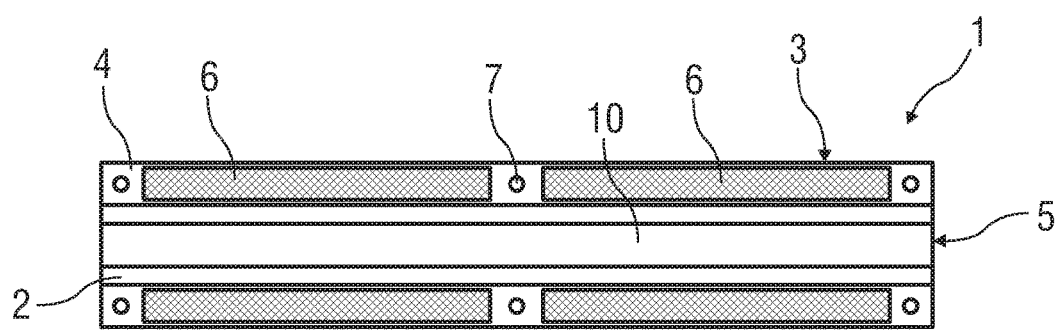
Figure 7:
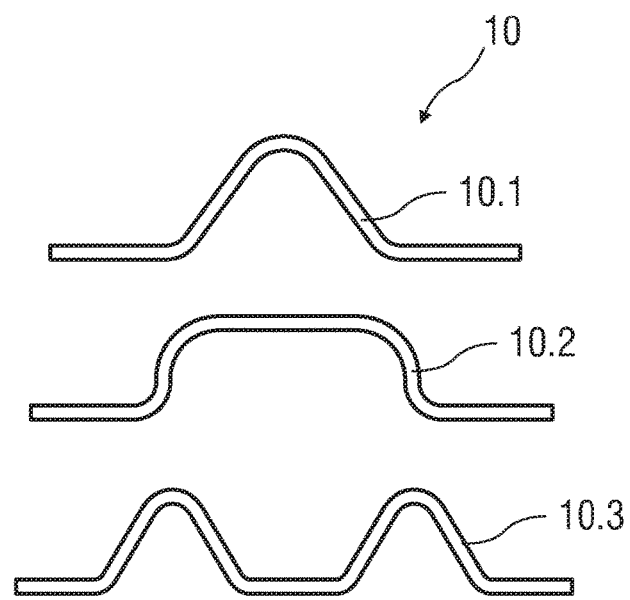
Figure 8:
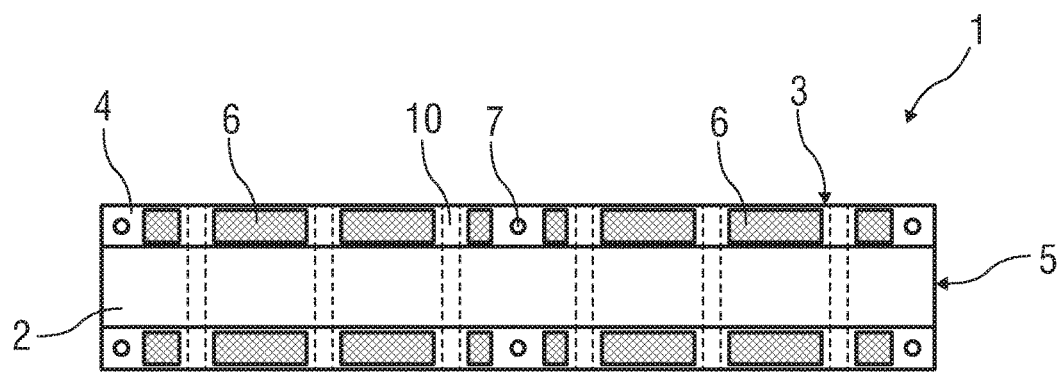
Figure 9:
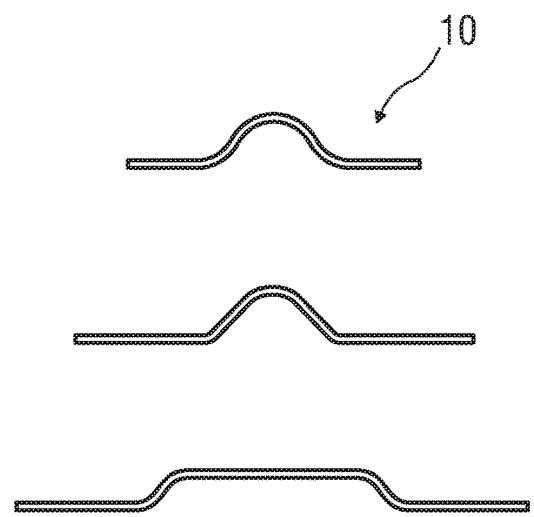
FIG. 9 shows schematically further cross-sectional variations of different embossed portions 10.
Figure 10:
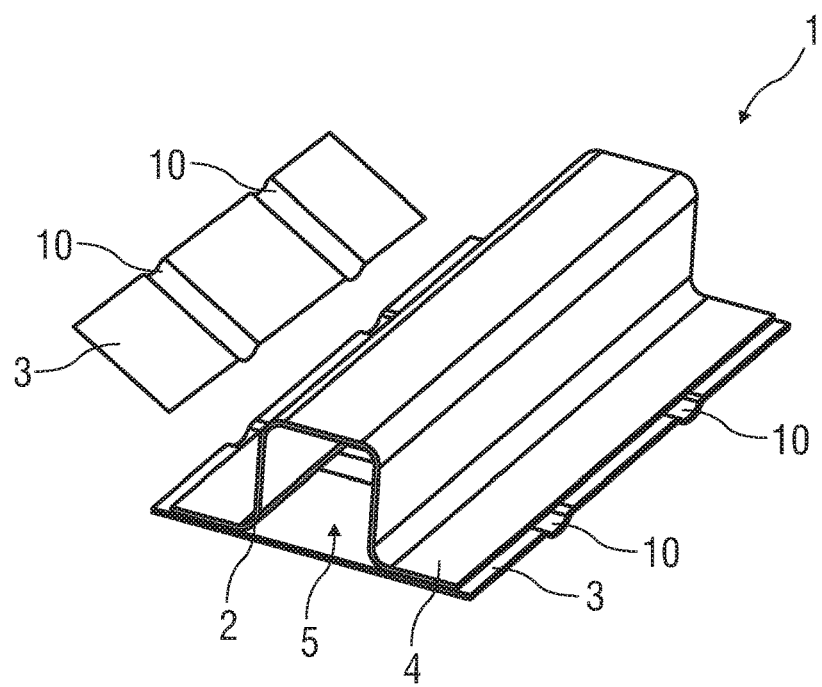
FIG. 10 shows schematically a perspective view of the seventh embodiment of the hybrid component 1 shown in FIG. 8.

FIG. 11 shows a construction of the hybrid component very similar to FIGS. 6 and 7, but with the difference that the embossed portions 10 are arranged in an x-shape in the sheet metal portion 3.

The embossed portions 10 are arranged so as to extend in an x-shape over the entire sheet metal portion 3, such that the portions of the flange regions 4 coated with adhesive 6 are interrupted by regions in which the embossed portions 10 extend.

In the region of the embossed portions 10 no adhesive 6 is arranged in the flange regions 4. As a result, riveted connections 7, portions coated with adhesive 6 and embossed portions 10 are arranged alternately in the flange regions 4.

Figure 12:
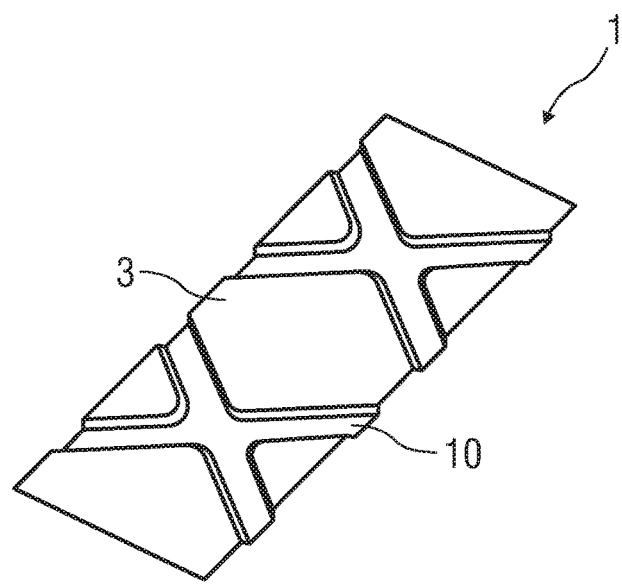

In FIG. 12 a detailed view of the sheet metal portion 3 with the x-shaped embossed portions 10 of the eighth embodiment of the hybrid component 1 is illustrated schematically in a perspective view.

Figure 13:
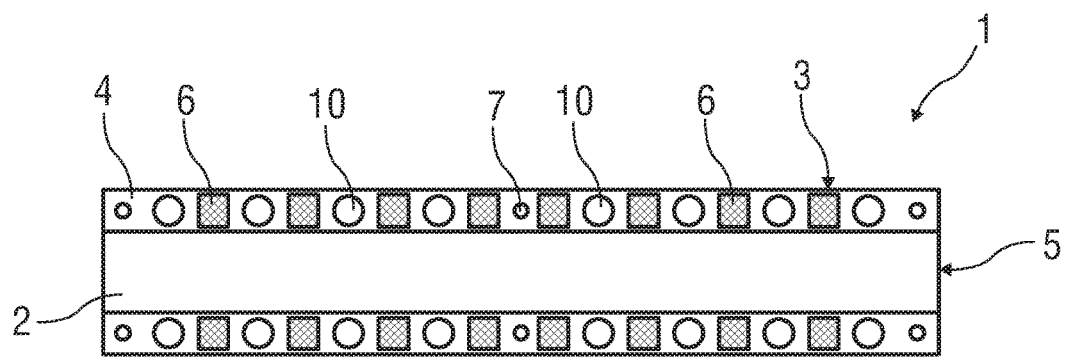

A partially transparent plan view of the hybrid component 1 produced by means of the method according to the invention in a ninth embodiment is shown schematically in FIG. 13.

Figure 5:
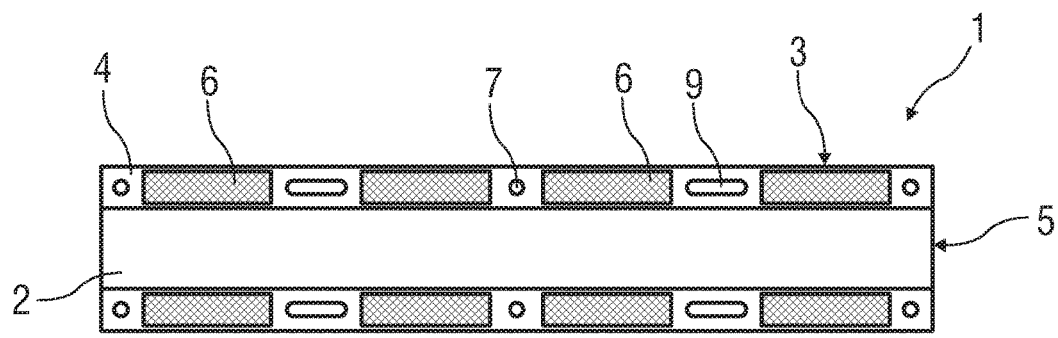

FIG. 13 shows a construction of the hybrid component 1 very similar to FIG. 5, but with the difference that instead of the elongated holes 9 in FIG. 5 circular embossed portions 10 are arranged in the flange region 4.

Thus riveted connections 7, portions coated with adhesive 6 and circular embossed portions 10 are arranged alternately in the flange regions 4. In the region of the embossed portions 10, no adhesive 6 is arranged between the sheet metal portion 3 and the profiled component 2. The embossed portions 10 are configured in the sheet metal portion 3 according to the corresponding embossed portions 10 in the profiled component 2 and arranged in a congruent manner in the hybrid component 1.

Figure 14:
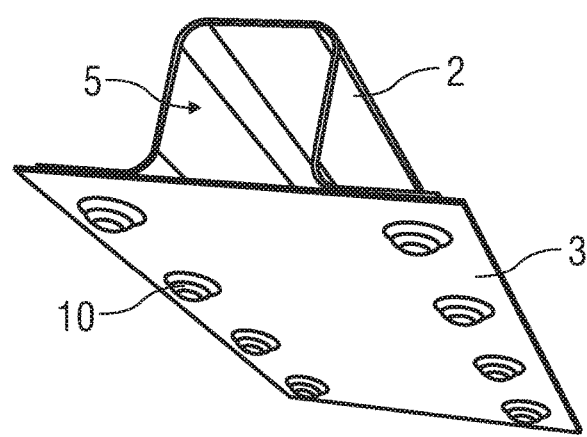

FIG. 14 shows schematically a detailed view of the ninth embodiment of the hybrid component 1 illustrated in FIG. 13, in a perspective view.

Figure 15:
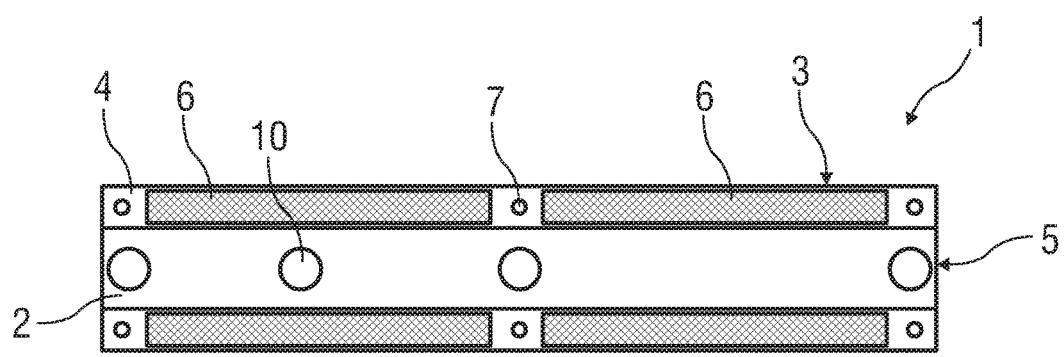

A partially transparent plan view of the hybrid component 1 produced by means of the method according to the invention in a tenth embodiment is shown schematically in FIG. 15.

Figure 1:
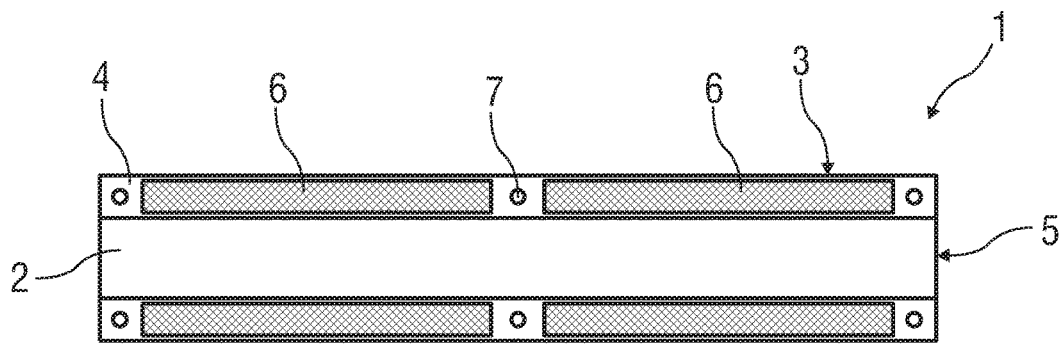
Figure 2:
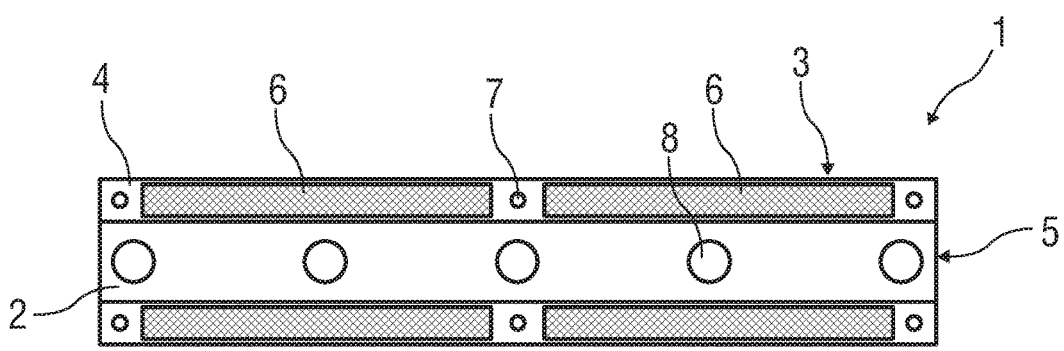
Figure 3:
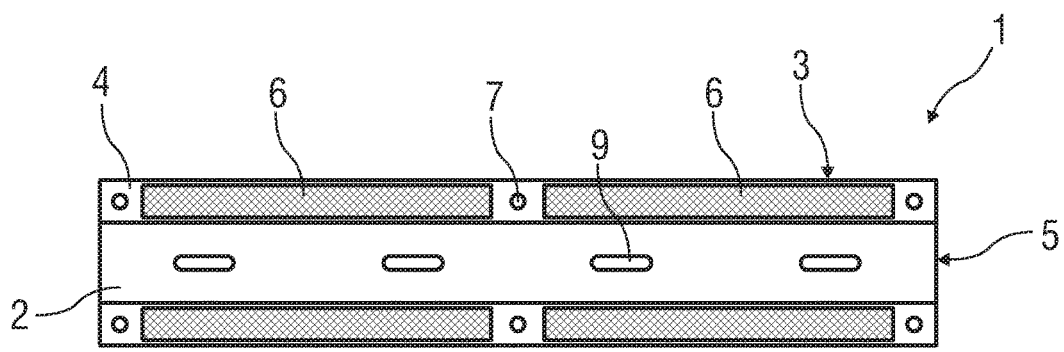
Figure 4:
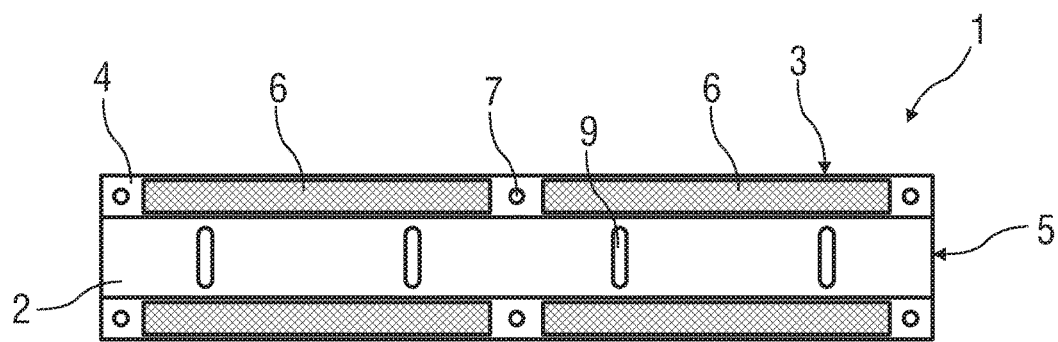

FIG. 15 shows a construction of the hybrid component 1, very similar to FIG. 6, but with the difference that instead of the individual central embossed portion 10 in FIG. 3, numerous circular embossed portions 10 are arranged in the sheet metal portion 3.

The circular embossed portions 10 are formed in the region of the sheet metal portion 3, in the same region which adjoins the internal space 5 of the hybrid component 1 formed between the sheet metal portion 3 and the profiled component 2. The circular embossed portions 10 are arranged adjacent to one another, uniformly spaced apart in the direction of the longitudinal extent of the hybrid component 1.

Figure 16:
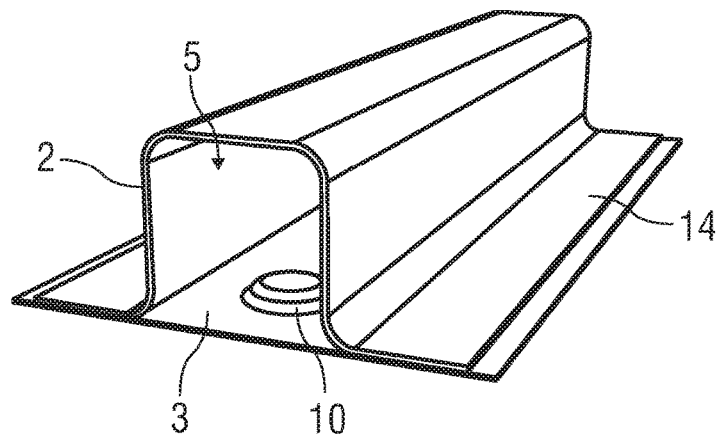

In FIG. 16 a detailed view of the tenth embodiment of the hybrid component 1 illustrated in FIG. 15 is illustrated schematically in a perspective and partially transparent view.

LIST OF REFERENCE NUMERALS

1 Hybrid component
2 Profiled component
3 Component
4 Flange region
5 Internal space
6 Adhesive material
7 Positive and/or non-positive connection
8 Round hole
9 Elongated hole
10 Embossed portion
10.1 Bead
10.2 Recess
10.3 Double bead

The invention claimed is:

1. A hybrid component for a structural element of vehicle seats, comprising:
   a profiled component made of a first material; and
   a component made of a second material,
   wherein the first material and the second material are different,
   wherein the profiled component is partially connected by a material connection to the component and is connected by a form-fitting connection and/or frictional connection outside the portions with the material connection,
   wherein the profiled component, which has a U-shaped cross section and a substantially planar flange region on both sides, is placed with its flange regions on a planar portion of the component, such that an internal space is formed between the profiled component and the component,
   wherein between the component and the flange regions an adhesive material is partially arranged as the material connection,
   wherein riveted connections are formed as the form-fitting connection and/or frictional connection outside the portions provided with the adhesive material in the flange regions,
   wherein, outside of the portions with the material connection and outside of the portions with the riveted connections, openings are formed on the profiled component and/or the component to allow for thermal compensation and/or to reduce the weight of the hybrid component, wherein riveted connections do not extend through the openings; and
   wherein the openings are elongated holes, wherein the portions of the flange regions provided with adhesive material are interrupted by regions in which the elongated holes are arranged, wherein the elongated holes are formed in the component and/or in the flange region of the profiled component, and wherein the elongated holes are aligned in their longitudinal extent according to the longitudinal extent of the flange region, such that the openings, the adhesive material, and the riveted connections are arranged alternately at the flange regions along the longitudinal extent of the hybrid component.

2. The hybrid component as claimed in claim 1, wherein the openings are formed on the component.

3. The hybrid component as claimed in claim 1, wherein the openings are through-holes.

* * * * *